April 19, 1966  G. R. TURBETT  3,247,356
TOOL OSCILLATING AND POSITIONING SYSTEM
Filed Dec. 26, 1963  2 Sheets-Sheet 1

INVENTOR.
George R. Turbett
BY
Edmund W Bopp
Agent

April 19, 1966 G. R. TURBETT 3,247,356
TOOL OSCILLATING AND POSITIONING SYSTEM
Filed Dec. 26, 1963 2 Sheets-Sheet 2
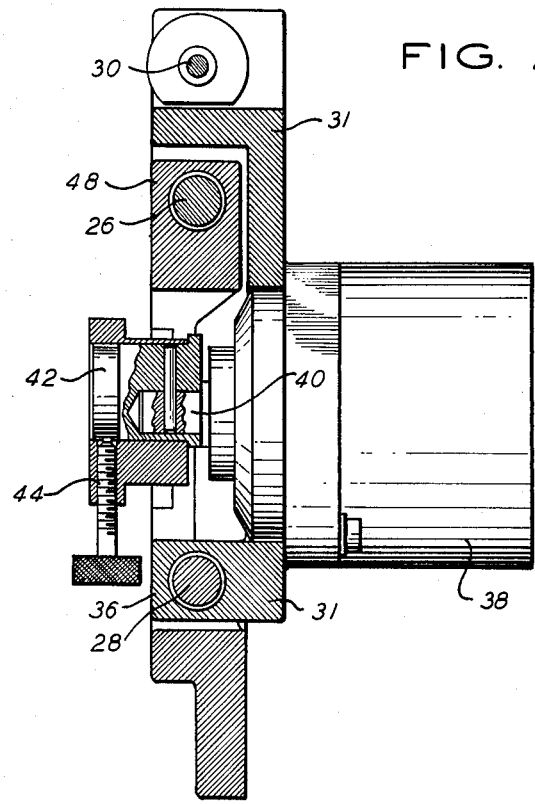
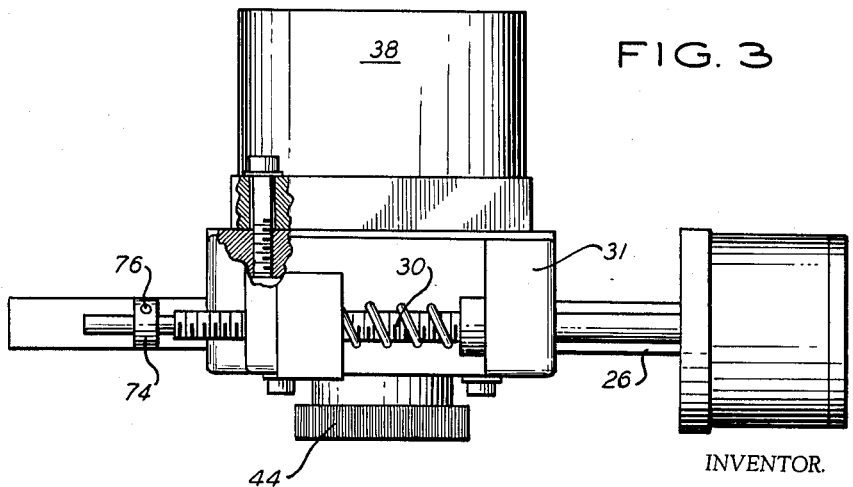
INVENTOR.
George R. Turbett
BY
Edmund W Bopp
Agent United States Patent Office 3,247,356
Patented Apr. 19, 1966

3,247,356
TOOL OSCILLATING AND POSITIONING
SYSTEM
George R. Turbett, Chatham Township, N.J., assignor to Air Reduction Company, Incorporated, New York, N.Y., a corporation of New York
Filed Dec. 26, 1963, Ser. No. 333,467
5 Claims. (Cl. 219—126)

This invention relates to tool oscillating and positioning systems and more particularly to means and methods for positioning a consumable welding electrode in a welding machine relatively to a path along which molten metal is to be laid down by the electrode and for causing the electrode to traverse repeatedly or oscillate over said path in order to distribute weld metal evenly over the length of the path in successive layers that are consolidated into a unitary mass such as a welded seam or a metallic overlay.

The invention is particularly applicable, but not limited, to a seam weld in a gap between generally vertically extending workpiece plates to be joined by welding, where the plates are relatively thick, requiring that the electrode be oscillated in the direction of the thickness dimension of the plates in order to distribute weld material evenly over the entire area of the seam.

An object of the invention is to facilitate and simplify the operation of centering an oscillatable electrode within its path of travel, as for example with respect to the thickness dimension of workpiece plates of given thickness.

A related object is to make a welding machine which has an oscillatable electrode readily adjustable to operate over paths of different length, as for example to operate with workpiece plates of any thickness within a wide range of thicknesses by merely setting a single dial and without the necessity of making any measurements or manipulations, beyond those made once and for all in an initial calibration.

Another object is to make readily adjustable the amplitude or length of swing of the oscillatory motion of the electrode.

Another object is to facilitate the initial calibration of the said single dial whereby further adjustment of the positioning mechanism is reduced to a single setting of the dial to correspond, for example to the known thickness of the workpiece plates.

A further object is to simplify and reduce the cost of a mechanism for positioning and oscillating a tool.

A feature of the invention is an arrangement for mounting upon a single pair of guide rods both a positionable motor mount for a motor that drives the oscillating mechanism and an independently slidable member for moving the electrode in oscillatory motion, the two devices being capable of limited sliding motion independently of one another over the same pair of guide rods without mutual interference.

Another feature is a direct reading dial calibrated to read the thickness of the workpiece plates and so geared as to move the oscillator motor mount half the distance indicated by the dial reading so that, for example, when workpiece plates of any specified thickness are to be welded, the dial is moved to read the desired thickness, whereby the axis of the electrode is moved so as to arrive at the center of the thickness dimension of the plates to be welded or the center of the desired path of travel of the electrode.

A further feature is a simple means for adjusting the amplitude of the oscillations.

Another feature is a provision for introducing dwell at the extreme ends of the stroke of the oscillating electrode in order to supply extra heat if needed where the weld bead is deposited in thermal contact with a welding dam such as is usually employed to retain molten material in the weld gap while the molten material solidifies, particularly as the welding dam is customarily water-cooled.

Other features, objects and advantages will appear from the following more detailed description of an illustrative embodiment of the invention, which will now be given in conjunction with the accompanying drawings.

Features relating to the direct reading calibrated dial arrangement as disclosed herein are claimed in a copending application of Eugene Koch, Serial No. 333,447, filed of even date herewith and assigned to the same assignee as the present application.

In the drawings:

FIG. 2 is a vertical sectional view, taken along the line 2—2 in FIG. 1; and

FIG. 3 is a top plan view, partly broken away, of the machine of FIGS. 1 and 2.

Figure 1:
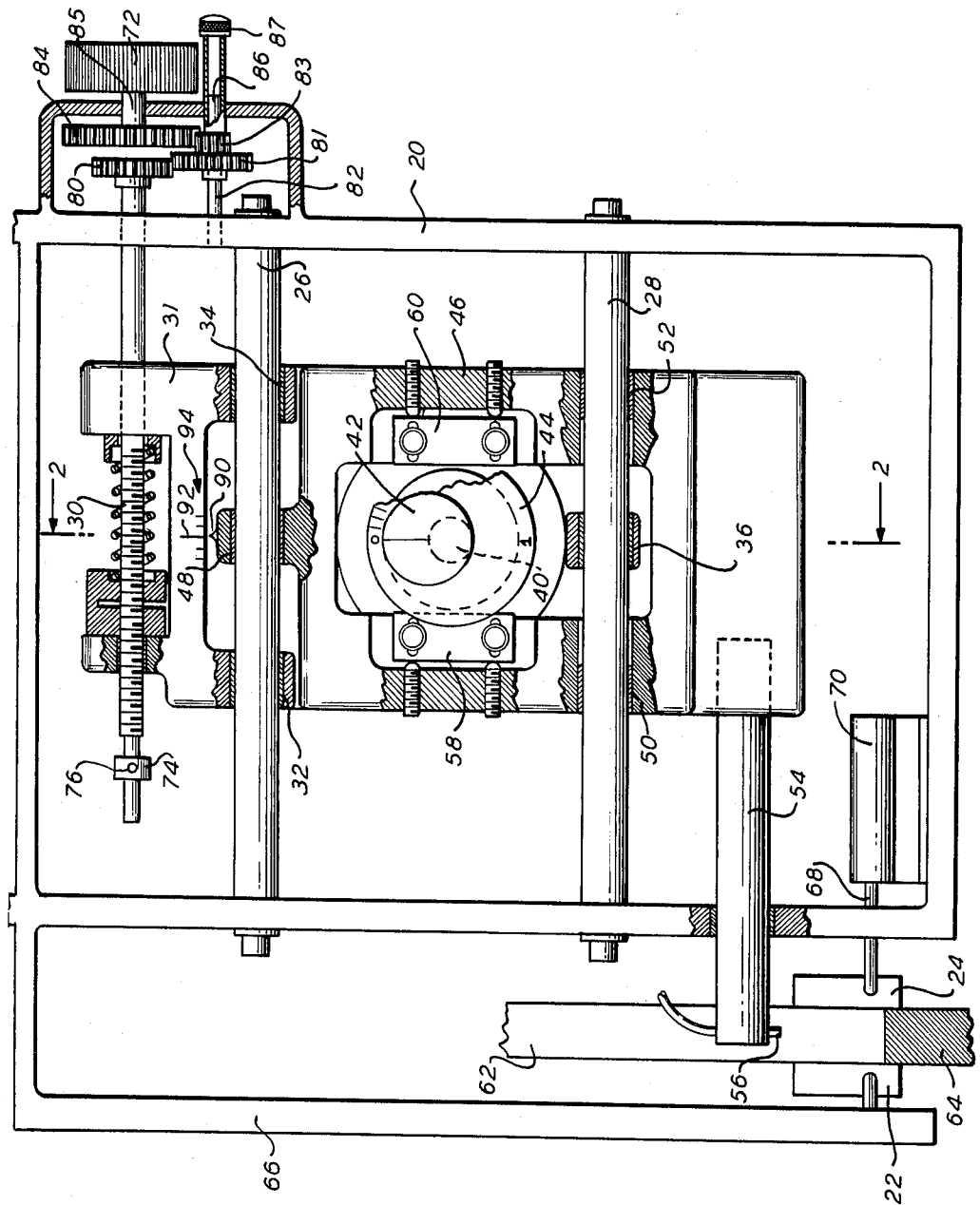
FIG. 1 is a front elevational view, partly broken away, of a portion of a welding machine embodying the invention.

The invention will be described with reference to an illustrative embodiment arranged for oscillating a welding electrode in the direction of the thickness dimension of workpiece plates to be welded together to form a substantially vertical seam, with the purpose of evenly distributing weld metal over the area of the seam. It will be understood however that the invention is not limited to the embodiment shown herein.

Referring to the drawings, a framework 20 with an attached fixed arm 66, in a welding machine, is shown supporting a relatively fixed welding dam 22, directly attached to arm 66, an adjustable welding dam 24, an upper guide rod 26, a lower guide rod 28 preferably in a common vertical plane with the rod 26, and also a lead screw 30.

A motor mount or carriage 31 is threadedly engaged with the lead screw 30 and in addition is slidably mounted upon the rods 26 and 28, preferably having relatively widely spaced slidable bearings 32 and 34 upon one rod, the rod 26 as shown, and a relatively central slidable bearing 36 upon the other rod 28. Mounted upon the carriage 31 is a motor 38 having a shaft 40 upon which shaft is mounted an inner cam 42 of a pair of cams 42 and 44, in peripheral contact with each other, the cam 44 being an outer or ring cam.

The cams 42 and 44 extend through a clearance opening in a slider 46 which is slidably mounted upon the rods 26 and 28 with a relatively central slidable bearing 48 upon the rod 26 between the bearings 32 and 34, and relatively widely spaced slidable bearings 50 and 52 upon the rod 28 to either side of the bearing 36. Clearance space is provided between the bearing 48 and the bearings 32 and 34, as well as between the bearing 36 and the bearings 50 and 52 to permit the desired maximum amplitude of oscillation of the slide 46 which in turn determines the maximum amplitude of oscillation of the tool or welding electrode. Fixedly attached to the slider 46 is an arm 54 from one end portion of which the arc sustaining tip 56 of the electrode extends into the arc region immediately above the upper edges of the welding dams 22 and 24.

The three-point bearing arrangement both in the mounting of the carriage or motor mount 31 and of the slider 46 gives to each of these two slidable elements a very stable and smoothly slidable operation, free from the likelihood of chattering or jamming. The two relatively widely spaced bearings of either of these elements upon one guide rod serve as a non-rocking main bearing for that element and the third bearing on the other guide rod serves as an out-rider to prevent rotation of the main bearings about the first guide rod. This arrangement, both in the motor mount and in the tool-oscillating slider, is particularly important during oscillation.

Cam followers 58 and 60 adjustably mounted upon the slider 46 are positioned to make at least intermittent contact with the cam 44, thus coupling together the carriage 31 and the slider 46 so that when the motor 38 rotates, motion is transmitted by way of the shaft 40, the cams 42 and 44, and one or the other of a pair of cam followers 58 and 60 to produce reciprocating motion of the slider 46 and of the arm 54 and electrode tip 56, with any desired amount of end dwell or lost motion.

It will be evident that, if no end dwell is required, a single cam follower spring-pressed against the cam 44 may be substituted for the pair of cam followers 58 and 60, in well known manner, or if desired, end dwell may be provided by suitable shaping of the cam 44.

The lead screw 30 runs parallel to the rods 26 and 28 and serves to provide a means for moving the carriage 31 along a line or path of travel determined by the rods 26 and 28 so that the center of oscillations of the electrode tip 56 may be varied to accommodate different lengths of travel and workpieces of different thicknesses. A workpiece plate 62 appears in edge-on view in FIG. 1, together with the cross section of a welded seam at 64, the welding dams 22 and 24 in this figure being shown clamped against the workpiece plate 62 and welded seam 64. It will be evident from this view that if workpiece plates of another thickness are substituted for those shown, the carriage 31 will have to be moved along its path of travel in order to maintain the center of oscillations of the electrode tip 56 at the center of the thickness dimension of the workpiece plate.

The welding dam 22 is shown pivotally attached to the arm 66 which in turn is rigidly attached to the main portion 20 of the framework. The welding dam 24 is yieldingly pressed against the workpiece plates through a pivotal joint by means of a piston rod 68 and a pneumatic cylinder 70. When the welding dams are clamped against the opposite sides of the workpiece plates a reference plane is defined by the working face of the dam 22 coincident with the faces of the workpiece plates which are pressed against the dam 22. Although the pivotal joints of the dams 22 and 24 permit a certain amount of adjustment of the dams to irregularities in the workpiece plates, the reference plane so determined by the dam 22 represents at all times the average position of the adjacent surface of the workpiece plates with respect to the electrode oscillating mechanism.

Each point in the framework 20 and any equipment attached to the framework has a uniquely defined position with respect to the reference plane above defined, not only under the conditions existing whenever the welding apparatus is clamped to a workpiece, but even though the welding machine is removed from the workpiece and returned thereto, or thereafter is clamped against another workpiece of different thickness from the first.

The lead screw 30 is turnable manually by means of a geared digital dial 72. A stop 74 may be secured to the shaft of the lead screw 30 by means of a set screw 76 to stop leftward motion of the carriage 31 as viewed in the figure when the electrode tip 56 reaches the vertical plane of the working face of the welding dam 22 at which point the stop 74 can be arranged to strike some portion of the carriage 31.

The digital reading of the dial 72 may be set to read zero when the carriage 31 is at such a point that the center of oscillation of the electrode tip 56 is in the reference plane determined by the working face of the welding dam 22. The gearing through which the dial 72 drives the lead screw 30 is proportioned so that a reading of one inch on the dial actually represents a carriage displacement of one-half inch from the position of the zero reading, and all other dial readings similarly represent carriage displacements from zero position of one-half the dial reading. Thus, if the zero reading is properly set, the dial reading will always thereafter indicate directly the workpiece thickness about which the electrode oscillation will automatically be centered.

Illustrative gearing for separably coupling the lead screw 30 to the dial 72 is shown schematically in FIG. 1. It will be evident that other forms of gearing may be substituted. A spur gear 80 is secured to the right hand end of the lead screw 30 as shown in the figure. An idler gear 81 which can be meshed with gear 80 is slidably mounted upon an auxiliary shaft 82. A gear 83 adjacent to the gear 81 and slidable therewith along the shaft 82 can be meshed with a spur gear 84, which is secured to a shaft 85, preferably aligned with the lead screw 30, to which shaft 85 the dial 72 is also secured. A collar 86 slidable over the shaft 82 and terminated in a button 87 is provided to facilitate meshing and unmeshing the gears 81 and 83 from the gears 80 and 84, respectively. Stops, or detents, not shown, may be provided in known manner to position the gears 81, 83 positively in meshed and unmeshed condition. The button 87 may then be drawn out to mesh the gear train and pushed in to unmesh. In the unmeshed condition, dial 72 may be turned independently of the lead screw 30.

It will be evident that the gear train 80, 81, 83, 84, or equivalent, may readily be so designed that one-half inch travel of the motor mount 31 along the lead screw 30 will result in a change in the reading of the digital dial 72 of one inch.

In terms of displacement of the motor mount, the dial 72 is arranged to indicate displacement, preferably in decimal parts of inches, of the motor mount along its path of travel, with reference to an arbitrary zero displacement, with gearing such as to make the indicated displacement twice the actual displacement, and the arbitrary zero displacement is made to correspond to a predetermined spacing between the motor mount and the reference plane.

Before describing the initial calibration of the device, reference is made to indicia in the form of two witness or index marks 90 and 92. These are shown in juxtaposition on the oscillating portion 46 and the non-oscillating portion 31, respectively, of the electrode oscillating mechanism. The mark 92 may be a single line or a part of a scale 94 and the mark 90 may be a line or it may be a finger or pointer projecting into proximity with the portion of part 31 bearing the scale 94 or index line 92. The lines may be engraved, stamped, scribed or otherwise applied. The indicia are preferably so positioned that elements 90 and 92 are in alignment when the member 46 is at the mid-point of its free travel between the bearings 32 and 34.

To begin the calibration, with the cam followers 58 and 60 retracted from contact with the cam 44, the part 31 is moved by means of the dial 72 to align the marks 90 and 92, and the cams 42 and 44 are rotated to the relative position which corresponds to zero eccentricity and the central position of oscillation. Then the cam followers 58 and 60 are brought into contact with the cam 44 and locked in this position.

The initial calibration of the dial 72 may now be continued as follows. The carriage 31, slider 46 and electrode tip 56 are moved as a unit by turning the dial 72, the motion of the carriage 31 being communicated to the slider 46 by means of the cam followers 58, 60. This motion is so directed as to bring the electrode tip into coincidence with the reference plane, to effect the desired zero setting. The coincidence may be checked by making suitable measurements from the electrode tip 56 to any convenient point in the arm 66 and also from the reference plane to the same point in the arm 66. With this zero adjustment made, the dial 72 may be set precisely to zero by temporarily disconnecting the digital indicator wheels of the dial from the lead screw 30, as above described, turning these wheels to zero reading and reconnecting the indicator to the lead screw without changing the rotational position of the lead screw. The calibration is thus completed. The stop 74 may now be set against a portion of carriage 31.

An alternative method of calibration will now be described, which will be preferred in some instances. This method is of the form of an initial adjustment made during assembly of the device. With the motor mount 31 and the slider 46 in place on the guide rods 26 and 28 and with the motor mount and slider temporarily locked together by any suitable means with the marks 90 and 92 in alignment, and with the electrode tip 56 or a rod in place thereof in operative position, the lead screw 30 may be turned to bring the electrode precisely to the reference plane. This may be done with or without the dial 72 attached to the shaft 85. Next the dial 72 is removed, set precisely to zero and reattached; or set to zero and attached for the first time, as the case may be. After attachment of the dial so set, the calibration is complete. When this procedure is used, there will generally be no need for a separable connection between the shaft 85 and the lead screw 30, so that the gearing 81, 83 may be permanently placed and need not be slidable.

Suitable direct reading digital dials for use as hereindescribed are obtainable from Borg Equipment Division, Amphenol-Borg Electronics Corporation, under the designation "Borg Microdial." Dials of this type include internal gearing and can be attached directly to any suitable shaft, for example lead screw 30, and may be set to zero or any other desired dial reading before they are attached to the shaft. The combination of the screw pitch of the lead screw 30, the gear ratio, and the numerical indicia on the dial 72 may be selected to give the desired numerical relationship between the travel of the member 31 in inches and decimals thereof, and the digital reading of the dial 72.

Whatever type dial is used, the screw pitch of the lead screw 30, the gear ratio intermediate between the lead screw and the dial, and the markings on the dial may be so selected as to give the same desired numerical relationship between tool travel and the change in the dial reading.

When lost motion or end dwell is incorporated in the system disclosed, it is not necessary to recalibrate the system or to return the system to a state of zero eccentricity or eliminate the lost motion before dial 72 is turned to a new thickness setting. All that is necessary to position the electrode whether or not end dwell is utilized is to turn the dial 72 to read the proper plate thickness. By this means, the center of the motor shaft is always brought to the proper position relatively to the reference plane required by the plate thickness to which the dial 72 is set and all oscillations of the electrode will be centered about the center of the plate, whether or not end dwell is set up by the positioning of the cam followers 58, 60.

Summarizing, the dial 72 having once been calibrated properly need only be set to read the thickness of workpiece plate that is to be welded, with the result that the oscillations of the electrode tip 56 will automatically be centered with reference to the thickness dimension of the workpiece plates. The desired amplitude of oscillation of the electrode tip may then be set by turning the cam 44 relatively to the cam 42 to the desired amplitude as indicated by a suitable scale marked for example on the face of the cam 44 or on the plate attached thereto to be aligned with an index mark scribed on the cam 42. The scale is preferably calibrated to amplitude by decimal parts of inches. It will be evident that the amplitude of the electrode oscillation should not be set so great as to exceed the limits of the thickness of the workpiece plates or molten material may be spilled or the electrode tip may strike some portion of the framework to cause an arc or other damage.

The bearing surfaces of the cam followers 58 and 60 are preferably made accurately parallel to each other. This is particularly important when end dwell is not to be utilized. In the latter case, if these surfaces are not parallel, the cam 44, whose outer surface is circular will not contact both cam followers continuously in the region where the distance between the cam followers is greater than the diameter of the cam 44, and will jam in the region where the distance between the cam followers is less than the diameter of the cam 44.

It will be evident to those skilled in the art that the invention may be utilized in other embodiments than that shown herein. For example, the electrode may be arranged to oscillate along the path or line of an overlay to distribute metal evenly along such path. A reference point or plane may be established at one end of the path and the dial 72 may be calibrated to read directly the length of the overlay so that the oscillations will have as their center the midpoint of the length of the overlay. It will also be evident that a wide variety of tools other than a welding electrode may be positioned and oscillated in like manner.

While illustrative forms of apparatus and methods in accordance with the invention have been described and shown herein, it will be understood that numerous changes may be made without departing from the general principles and scope of the invention.

What is claimed is:

1. In a tool oscillator, in combination, a pair of parallel guide rods, an oscillator motor mount slidably mounted upon said guide rods by means of two relatively widely spaced slidable bearings upon a first of said guide rods and a third slidable bearing upon the second of said guide rods, a motor mounted upon said motor mount, a slider slidably mounted upon said guide rods, by means of two relatively widely spaced slidable bearings upon said second guide rod and a third slidable bearing upon the said first guide rod, eccentric means connecting said motor to said slider for imparting oscillatory motion to said slider along and guided by said guide rods and a tool attached to and movable with said slider.

2. In a tool oscillator, in combination, a pair of parallel guide rods, an oscillator motor mount slidably mounted upon said guide rods by means of two relatively widely spaced slidable bearings upon a first of said guide rods and a relatively central slidable bearing upon the second of said guide rods, a motor mounted upon said motor mount, a slider slidably mounted upon said guide rods by means of a relatively central slidable bearing upon the first of said guide rods between said two relatively widely spaced bearings for said motor mount and by means of two relatively widely spaced slidable bearings upon the said second of said guide rods upon either side and spaced apart from said relatively central bearing for said motor mount, eccentric means connecting said motor to said slider for imparting oscillatory motion to said slider along and guided by said guide rods, and a tool attached to and movable with said slider.

3. Apparatus according to claim 2, in which said eccentric connecting means is adjustable as to degree of eccentricity.

4. In an electrode oscillator for welding, in combination, a pair of parallel guide rods fixedly mounted with respect to a welding head, a welding dam fixedly mounted with respect to said welding head, a working surface of said welding dam determining a reference plane, said guide rods being arranged to permit motion of components guided thereby along a path of travel in a direction substantially perpendicular to said reference plane, an oscillator motor mount slidably mounted upon said guide rods by means of two relatively widely spaced slidable bearings upon a first of said guide rods and a relatively central slidable bearing upon the second of said guide rods, a motor mounted upon said motor mount, a slider slidably mounted upon said guide rods by means of a relatively central slidable bearing upon the first of said guide rods between said two relatively widely spaced bearings for said motor and by means of two relatively widely spaced slidable bearings upon the second of said guide rods upon either side and spaced apart from said relatively central bearing for said motor mount, eccentric means connecting said motor to said slider for imparting oscillatory motion to said slider along and guided by said guide rods, and a welding electrode attached to and movable with said slider.

5. In a welding machine, in combination a first welding dam attached to a fixed point in the framework of the machine, a second welding dam movably attached to said framework, means to clamp a workpiece plate between said first and second welding dams, the working surface of said first welding dam defining a reference plane which is substantially coincident with the plane of one side of the workpiece plate when said plate is clamped between said first and second welding dams, a pair of parallel guide rods fixedly mounted with respect to the framework of the machine, said guide rods being arranged to permit motion of components guided thereby along a path of travel in a direction substantially perpendicular to said reference plane, an oscillator motor mount slidably mounted upon said guide rods by means of two relatively widely spaced slidable bearings upon a first of said guide rods and a relatively central slidable bearing upon the second of said guide rods, a motor mounted upon said motor mount, a slider slidably mounted upon said guide rods by means of a relatively central slidable bearing upon the first of said guide rods between said two relatively widely spaced bearings for said motor mount and by means of two relatively widely spaced slidable bearings upon the second of said guide rods upon either side and spaced apart from said relatively central bearing for said motor mount, eccentric means connecting said motor to said slider for imparting oscillatory motion to said slider along and guided by said guide rods, and a welding electrode attached to and movable with said slider.

References Cited by the Examiner
UNITED STATES PATENTS

| | | | |
|---|---|---|---|
| 1,956,406 | 4/1934 | Vars | 219—125 |
| 2,472,803 | 6/1949 | Beyer et al. | 219—125 |
| 2,817,748 | 12/1957 | Meyer | 219—126 |
| 3,019,327 | 1/1962 | Engel | 219—76 |
| 3,035,156 | 5/1962 | Staley | 219—125 |

RICHARD M. WOOD, *Primary Examiner.*